United States Patent [19]

Fenton et al.

[11] Patent Number: 5,373,875
[45] Date of Patent: Dec. 20, 1994

[54] RING SAW

[76] Inventors: David S. Fenton, General Delivery, Grovedale, Alberta, Canada, T0H 1X0; Lester D. Oilund, 9862 Prairie Rd., Grande Prairie, Alberta, Canada, T8V 3R9

[21] Appl. No.: 181,245

[22] Filed: Jan. 13, 1994

[51] Int. Cl.$^5$ .............................. A01G 23/08
[52] U.S. Cl. .................... 144/34 R; 83/788; 83/848; 144/3 D; 144/336
[58] Field of Search ............... 30/379.5, 385; 83/788, 83/740, 843, 848, 853, 928; 144/3 D, 34 R, 218, 223, 236, 335, 336

[56]        References Cited
        U.S. PATENT DOCUMENTS

| 3,915,209 | 10/1975 | Denis | 144/34 R |
| 4,013,106 | 3/1977 | Albright | 144/34 R |
| 4,081,009 | 3/1978 | Curlett | 144/34 R |
| 4,625,781 | 12/1986 | Miller et al. | 144/34 R |
| 4,738,291 | 4/1988 | Isley | 144/34 R |

FOREIGN PATENT DOCUMENTS

| 21555/88 | 8/1988 | Australia | B27B 033/08 |
| 1055366 | 5/1979 | Canada | 144/28 |
| 1291396 | 10/1991 | Canada | 144/27 |
| 424705 | 1/1975 | U.S.S.R. | |

Primary Examiner—W. Donald Bray
Attorney, Agent, or Firm—Anthony R. Lambert

[57]        ABSTRACT

A ring saw is described which has a novel construction for centering the cutting ring. The ring saw is characterized by a groove in the inner annular surface of the cutting ring. A plurality of rollers are provided which engage the groove in the inner annular surface. The rollers serve to center the cutting ring relative to the saw body while withstanding axial and radial loads placed upon the cutting ring. The construction, as described, serves to increase the capacity of the cutting ring to withstand radial and axial loading.

4 Claims, 2 Drawing Sheets

5,373,875

RING SAW

BACKGROUND OF THE INVENTION

Ring saws have a circular disc-shaped saw body with a circumferential edge. A cutting ring is mounted for rotation about the circumferential edge. The cutting ring has an inner annular surface with gear teeth. At least one drive gear is rotatably mounted in the saw body. The drive gear engages the gear teeth on the inner annular surface to rotate the cutting ring.

Ring saws used in the forestry industry for cutting down trees are subjected to significant radial and axial loading. Radial loading occurs as the cutting ring engages the tree. Axial loading occurs as cutting progresses and the weight of the tree bears upon the cutting ring.

Canadian Patent 1,291,396 discloses an improved ring saw which addresses the "difficulty in mounting the ring saw on the saw body to take stresses such as those applied by a tree resting on the saw". This ring saw has a track in which the cutting ring rotates. The track has a number of arcuate "bearing grooves" arranged in end to end relation in which are received "bearing strips". The bearing strips are described as being "made from a suitable plastic material having a low coefficient of friction". The cutting ring has an inwardly projecting annular flange. Three idler gears cooperate with the inwardly projecting flange to help center the cutting ring during rotation and cutting operations. The inwardly projecting flange is sandwiched between the bearing strips to withstand axial loading.

There are a number of problems with the teachings of Canadian Patent 1,291,396. Firstly, the engagement between the bearing strips and the inwardly projecting annular flange on the cutting ring is intended to serve a dual purpose of a bearing surface and a sealing surface. However, the plastic bearing material of the bearing strips will invariably experience deterioration under heavy axial loading which reduces its ability to function as a sealing surface. Without effective sealing dirt and debris enter into the gears and decrease the operational life of the gears. Secondly, the number of rotations per minute of the cutting ring is limited by the friction properties of the plastic bearing material of the bearing strips. Thirdly, when the gears perform a centering function they are subjected to radial loads, which reduces the operational life of the gears.

SUMMARY OF THE INVENTION

What is required is a ring saw which can withstand radial and axial loading without experiencing the disadvantages experienced in the prior art.

According to the present invention there is provided a ring saw having a circular disc-shaped saw body with a circumferential edge. A cutting ring is mounted fox rotation about the circumferential edge. The cutting ring has an inner annular surface with gear teeth. At least one drive gear is rotatably mounted in the saw body. The drive gear engages the gear teeth on the inner annular surface to rotate the cutting ring. The ring saw is characterized by a groove in the inner annular surface of the cutting ring. A plurality of rollers are provided which engage the groove in the inner annular surface. The rollers serve to center the cutting ring relative to the saw body while withstanding axial and radial loads placed upon the cutting ring.

With the ring saw, as described, the gears do not have to bear any axial and radial loads. The gears only function is to drive the cutting ring which greatly prolongs their operating life. It is preferred that the groove be centrally positioned on the inner annular surface.

Although beneficial results may be obtained through the use of the ring saw, as described, due to the large differences in the diameters of the rollers and the mating groove in the ring there tends to be a sliding motion on both sides of the groove where the roller and the groove meet. Even more beneficial results may, therefore, be obtained when the groove has a bottom and a peripheral edge and is flared outwardly by approximately 3 to 5 degrees from the bottom to the peripheral edge. Similarly, each of the rollers have a root and a tip and are tapered inwardly by approximately 3 and 5 degrees from the root to the tip. This reduces the contact surfaces, but not to the extent of creating point loading.

Although beneficial results may be obtained through the use of the ring saw, as described above, better performance can be obtained if gear tooth loading is reduced. Even more beneficial results may be obtained when there are two drive gears, as this distributes the gear tooth loading.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 3:
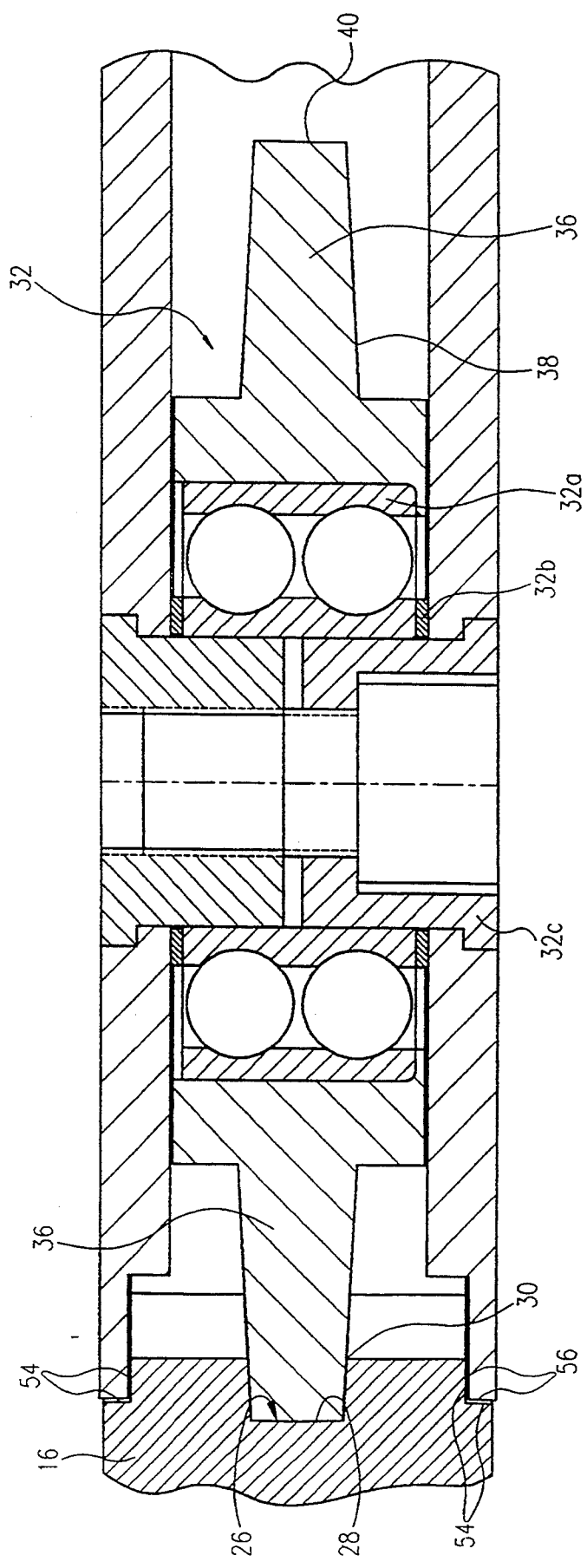
FIG. 3 is a detailed side elevation view in longitudinal section of a roller illustrated in FIG. 1.

The preferred embodiment, a ring saw generally identified by reference numeral 10, will now be described with reference to FIGS. 1 through 3.

Figure 1:
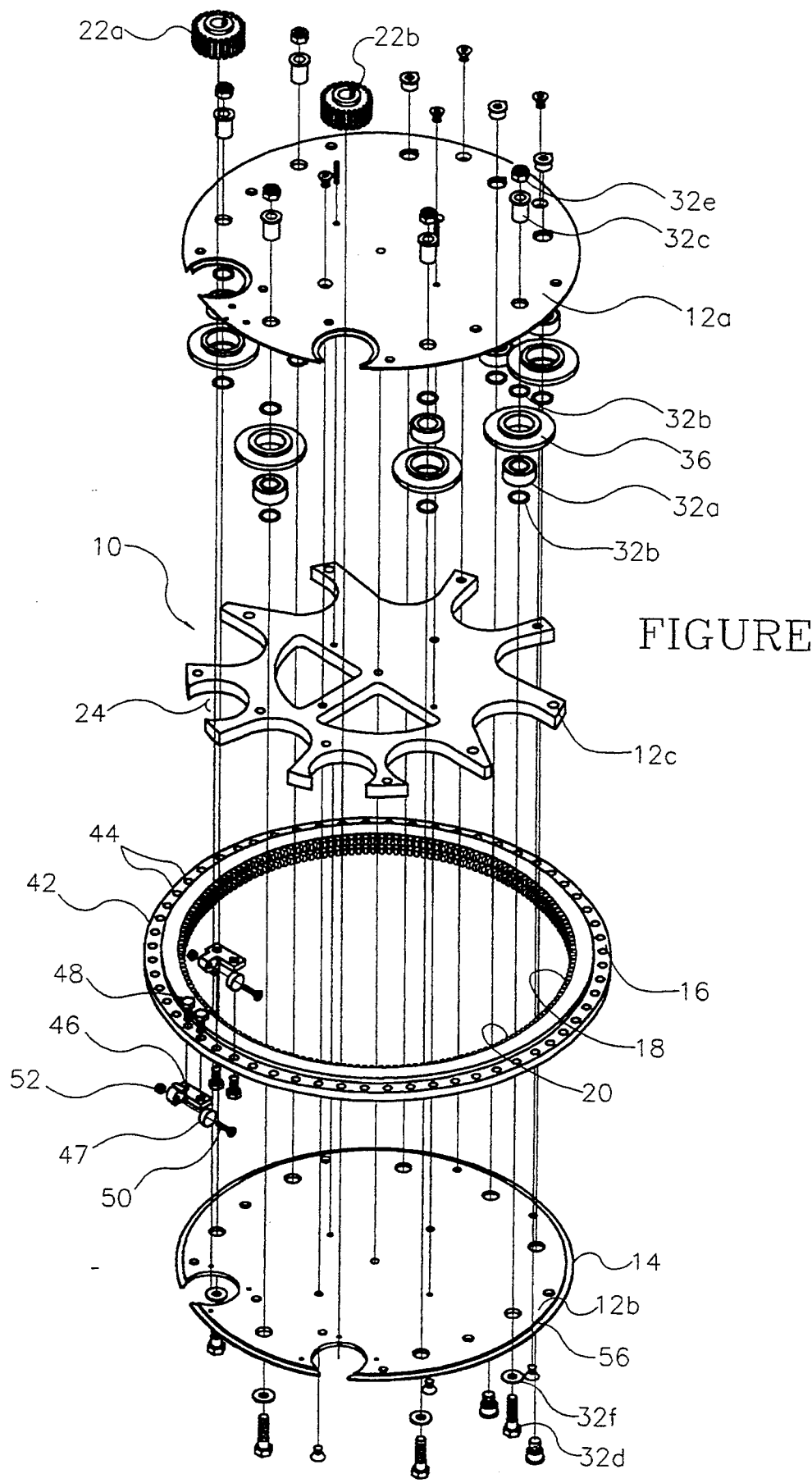
FIG. 1 is an exploded perspective view of a ring saw constructed in accordance with the teachings of the present invention.
Figure 2:
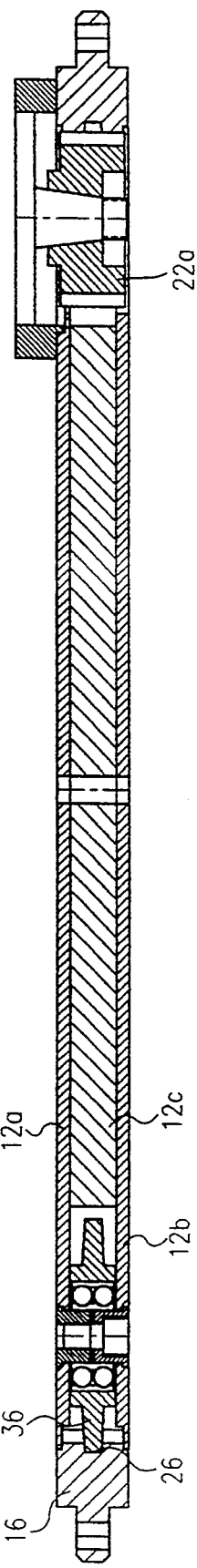
FIG. 2 is a side elevation view in longitudinal section of a ring saw constructed in accordance with the teachings of the present invention.

Referring to FIG. 1, Ring saw 10 has a circular disc-shaped saw body 12. For ease of assembly, saw body 12 consists of a top plate 12a, a bottom plate 12b and a filler plate 12c. Saw body 12 has a circumferential edge 14. A cutting ring 16 is mounted for rotation about circumferential edge 14. Cutting ring 16 has an inner annular surface 18 with inwardly projecting gear teeth 20. Two pinion drive gears 22a and 22b are rotatably mounted in pockets 24 in saw body 12. Drive gears 22a and 22b engage gear teeth 20 on inner annular surface 18 to rotate cutting ring 16. Referring to FIGS. 2 and 3, a central groove 26 is positioned in inner annular surface 18 of cutting ring 16. Groove 26 has a bottom 28 and a peripheral edge 30, and is flared outwardly by approximately 3 to 5 degrees from bottom 28 to peripheral edge 30. Eight roller assemblies 32 are sandwiched between top plate 12a and bottom plate 12b, rotatably mounted in pockets 24 in filler plate 12c. Each of roller assembly 32 has a roller 36 which engages groove 26 in inner annular surface 18, thereby centering cutting ring 16 relative to saw body 12. Roller assemblies 32 bear substantially all axial and radial loads placed upon cutting ring 16. Roller 36 has a root 38 and a tip 40, and is tapered inwardly by approximately 3 and 5 degrees from root 38 to tip 40. Each roller assembly 32 also includes an annular bearing 32a, two spacers 32b, a roller locating pin 32c, a bolt 32d, a mating nut 32e and a washer 32f. Referring to FIG. 1, cutting ring 16 has a peripheral edge 42 with a plurality of bolt receiving apertures 44. Cutting tooth holders 46, each of which are adapted to secure a cutting tooth 47, are attached to peripheral edge 42 of cutting ring 16 by means of bolts 48. Cutting teeth 47 are attached to cutting tooth holders 46 by capscrews 50 and lock nuts 52. Referring to FIG. 3, cutting ring 16 and saw body 12 have sealing surfaces 54 and 56, respectively, which prevent dirt and debris from entering into saw body 12.

The use and operation of ring saw 10 will now be described with reference to FIGS. 1 through 3. Prior to use a drive motor (not shown) is connected to drive gears 22a and 22b and serves to rapidly rotate drive gears 22a and 22b. Drive gears 22a and 22b engage gear teeth 20 on inner annular surface 18 to rotate cutting ring 16. It is important to note that the sealing and bearing functions have been separated. Sealing surface 54 on cutting ring 16 and sealing surface 56 on saw body 12 prevent dirt and debris from entering into saw body 12. Sealing surfaces 54 and 56 do not also have to serve as bearing surfaces. Axial and radial loading is born by roller assemblies 32. The transfer of axial and radial loads to each roller assembly 32 is made through rollers 36 which engage groove 26 in inner annular surface 18 of cutting ring 16. The tapering of rollers 36 and the corresponding tapering of groove 26, helps reduce, if not entirely eliminate, the sliding of roller 36 in groove 26. The force required to drive cutting ring 16 is evenly distributed between drive gears 22a and 22b, this help reduce gear tooth loading which can lead to premature gear failure.

It will be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. A ring saw having a circular disc-shaped saw body with a circumferential edge, a cutting ring mounted for rotation about the circumferential edge, the cutting ring having an inner annular surface with gear teeth, at least one drive gear rotatably mounted in the saw body, the drive gear engaging the gear teeth on the inner annular surface to rotate the cutting ring, characterized by:
    a. a groove centrally positioned in the inner annular surface of the cutting ring; and
    b. a plurality of rollers which engage the groove in the inner annular surface thereby centering the cutting ring relative to the saw body while withstanding axial and radial loads placed upon the cutting ring.

2. The ring saw as defined in claim 1, wherein the groove has a bottom and a peripheral edge, the groove being flared outwardly by approximately 3 to 5 degrees from the bottom to the peripheral edge, each of the rollers having a root and a tip, the rollers being tapered inwardly by approximately 3 and 5 degrees from the root to the tip.

3. The ring saw as defined in claim 1, wherein there are two drive gears.

4. A ring saw having a circular disc-shaped saw body with a circumferential edge, a cutting ring mounted for rotation about the circumferential edge, the cutting ring having an inner annular surface with gear teeth, at least one drive gear rotatably mounted in the saw body, the drive gear engaging the gear teeth on the inner annular surface to rotate the cutting ring, characterized by:
    a. a groove centrally positioned in the inner annular surface of the cutting ring, the groove having a bottom and a peripheral edge, the groove being flared outwardly by approximately 3 to 5 degrees from the bottom to the peripheral edge; and
    b. a plurality of rollers which engage the groove in the inner annular surface thereby centering the cutting ring relative to to the saw body while withstanding axial and radial loads placed upon the cutting ring, the rollers having a root and a tip, the rollers being tapered inwardly by approximately 3 and 5 degrees from the root to the tip.

* * * * *